United States Patent
Geromiller

(10) Patent No.: US 10,434,586 B2
(45) Date of Patent: Oct. 8, 2019

(54) HANDHELD WORK APPARATUS

(71) Applicant: Andreas Stihl AG & Co. KG, Waiblingen (DE)

(72) Inventor: Ludwig Geromiller, Welzheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 71 days.

(21) Appl. No.: 15/816,797

(22) Filed: Nov. 17, 2017

(65) Prior Publication Data
US 2018/0141139 A1    May 24, 2018

(30) Foreign Application Priority Data
Nov. 22, 2016   (DE) .......................... 10 2016 013 907

(51) Int. Cl.
| B23D 45/16 | (2006.01) |
| B25F 5/02 | (2006.01) |
| B23D 47/12 | (2006.01) |
| B27B 17/02 | (2006.01) |

(52) U.S. Cl.
CPC ............. *B23D 45/16* (2013.01); *B23D 47/12* (2013.01); *B25F 5/02* (2013.01); *B27B 17/025* (2013.01)

(58) Field of Classification Search
CPC ...... B23D 45/16; B23D 47/12; B27B 17/025; B25F 5/02
USPC ........................................................ 30/388
See application file for complete search history.

(56) References Cited

U.S. PATENT DOCUMENTS

| 3,583,106 | A | * | 6/1971 | Dobbertin | ............... B24B 27/08 30/122 |
| 3,893,240 | A | * | 7/1975 | Morner | ................... B24B 27/08 30/390 |
| 5,730,561 | A | * | 3/1998 | Wambeke | .............. B23D 45/16 30/122 |
| 7,137,877 | B2 | | 11/2006 | Uhl et al. | |
| 9,221,111 | B2 | | 12/2015 | Elfner et al. | |
| 2012/0234572 | A1 | * | 9/2012 | Kratzig | .................. A01G 3/053 173/213 |
| 2014/0360029 | A1 | * | 12/2014 | Adams | ...................... B25F 5/02 30/392 |
| 2015/0038064 | A1 | * | 2/2015 | Elfner | ..................... B25B 23/02 451/359 |
| 2017/0066068 | A1 | | 3/2017 | Hanussek et al. | |
| 2017/0072482 | A1 | | 3/2017 | Hanussek et al. | |
| 2018/0141139 | A1 | * | 5/2018 | Geromiller | .......... B27B 17/025 |

FOREIGN PATENT DOCUMENTS

EP    3 338 974 A1 *  11/2017

* cited by examiner

*Primary Examiner* — Hwei-Siu C Payer
(74) *Attorney, Agent, or Firm* — Walter Ottesen, P.A.

(57) ABSTRACT

A handheld work apparatus has a motor unit, a tool unit and an outrigger having a carrier part. The outrigger connects the motor unit to the tool unit. The carrier part has a base plate having an inner side and an outer side. A drive shaft and a driven shaft are arranged transversely to the base plate. The carrier part has a first stiffening structure, which rises from the inner side of the base plate toward a space diagonal. On the outer side of the base plate, a second stiffening structure rises toward the same space diagonal, wherein the first stiffening structure and the second stiffening structure conjointly form a spatially diagonally running stiffening element.

17 Claims, 7 Drawing Sheets

HANDHELD WORK APPARATUS

CROSS REFERENCE TO RELATED APPLICATION

This application claims priority of German patent application no. 10 2016 013 907.2, filed Nov. 22, 2016, the entire content of which is incorporated herein by reference.

BACKGROUND OF THE INVENTION

A handheld work apparatus having an outrigger, namely, a handheld, motor-driven cutoff machine, is known from U.S. Pat. No. 7,137,877. The outrigger of the cutoff machine has on its inner side reinforcement struts for stiffening purposes. The reinforcement struts run adjacent to a peripheral wall of the outrigger.

SUMMARY OF THE INVENTION

An object of the invention is to provide a handheld work apparatus of the generic type, the outrigger of which has a high stiffness combined with low weight.

The invention is for a portable handheld work apparatus including: a motor unit; a work tool unit; an outrigger connected to the work tool unit; the outrigger including a carrier part; the carrier part having a base plate defining an inner side and an outer side facing toward the motor unit; the base plate having a periphery; the carrier part including a peripheral wall at the periphery for delimiting the base plate; the peripheral wall having a predetermined length and being configured to rise exclusively from the inner side of the base plate over at least 50% of the predetermined length; a drive shaft running rotatably driven about a first axis transverse to the base plate; a driven shaft running parallel to the drive shaft and being rotatably journalled about a second axis; the carrier part defining a coordinate system having an x-axis, a y-axis and an origin O; the x-axis defining a connecting line interconnecting the first and second axes when viewed onto the carrier part along the first axis; the y-axis being arranged perpendicularly to the connecting line and to the first axis and to run midway between the first axis and the second axis; the coordinate system having four quadrants on the inner side and four quadrants on the outer side with first segments (A, B, C, D) of the carrier part being disposed in corresponding ones of the inner side four quadrants and second segments (E, F, G, H) of the carrier part being disposed in corresponding ones of the outer side four quadrants; the carrier part having at least one spatial diagonal which runs through one of the segments on the outer side and one of the segments on the inner side with the one segment on the outer side lying opposite to the one segment on the inner side with reference to the origin O of the coordinate system; at least a first reinforcement structure rising from the inner side of the base plate to the one spatial diagonal; and, at least a second reinforcement structure rising from the outer side of the base plate to the one spatial diagonal so as to cause the first reinforcement structure and the second reinforcement structure to conjointly define a spatial diagonal composite reinforcement structure.

The carrier part of the outrigger has not only on its inner side, but also on its outer side, a stiffening structure. The stiffening structures are arranged on the base plate of the carrier part so that they form a spatially diagonally running stiffening element.

It has been shown that the torsional vibrations on the carrier part of the outrigger, which are generated during operation, can be effectively absorbed by spatially diagonally running stiffening elements. The diagonal direction here relates to the longitudinal direction of the carrier part, a hereto perpendicular vertical direction of the carrier part, and a depth direction of the carrier part. The carrier part has a coordinate system, which is spanned by the longitudinal direction of the carrier part and a vertical direction extending perpendicular hereto. The carrier part has a first axis, about which the drive shaft is rotatingly driven, and a second axis, about which the driven shaft is rotatingly driven. The connecting line of the two axes in a direction of view in the direction of the first axis forms the x-axis of the coordinate system. The direction of view in the direction of the first axis is here a direction of view in which the motor housing lies behind the outrigger. In this direction of view, the x-axis is directed from the first axis to the second axis. The connecting line is arranged spatially perpendicular to the first axis and to the second axis. The x-axis runs spatially perpendicular to the axes of drive shaft and driven shaft. The y-axis stands spatially perpendicular to the connecting line of the two axes and to the first axis. In the direction of view in the direction of the first axis, the y-axis runs midway between the first and the second axis. The y-axis, which forms the vertical direction, intersects the connecting line of the first and the second axis of drive shaft and driven shaft, hence midway between the two axes.

The two-dimensional Cartesian coordinate system consisting of x-axis and y-axis has four sectors, which are delimited by the positive x-axis and the positive y-axis, the positive x-axis and the negative y-axis, the negative x-axis and the negative y-axis, and the negative x-axis and the positive y-axis. In these four sectors of the coordinate system, a segment of the carrier part lies respectively on the inner side and on the outer side of the carrier part. The segments are hence separated from each other by the base plate of the carrier part and the axes of the coordinate system. The segments of the carrier part here lie contiguous to one another or to the base plate. The diagonal direction is defined by a space diagonal on which a segment runs on the outer side and a segment lying opposite from the origin of the coordinate system runs on the inner side. The segment lying opposite from the origin of the coordinate system has both for the x-direction and for the y-direction an opposite sign.

The carrier part has a first stiffening structure, which rises from the inner side of the base plate toward the space diagonal. From the outer side of the base plate, at least a second stiffening structure rises toward the same space diagonal. As a result, a spatially diagonally running stiffening element is formed. Via this spatially diagonally running stiffening element, in particular torsional vibrations can be very effectively absorbed. On the respectively opposite side of the base plate, at least in part no stiffening structure is preferably provided. The base plate denotes that unstiffened, plate-shaped part of the carrier part to which the elevations connect. The sides of the base plate are the inner side and the outer side.

The stiffening element can be configured as an uninterrupted stiffening strut extending spatially diagonally through the base plate. Particularly preferably, the stiffening element is formed however, at least in part, by an expedient arrangement of pre-existing elevations, such as, for instance, fastening eyes or receiving pockets. A stiffening element can hence be formed in particular also by mutually spaced, partially rising stiffening structures. In regions in which the space diagonal runs on the outer side, the stiffening element can also comprise partial stiffening structures on the inner side, and vice versa. In this case, the stiffening structures rise at the first end of the stiffening element, but predominantly from one side face of the carrier part, and at its other end predominantly from the other side face of the carrier part, and in a middle region on neither of the two side faces, or only with a lesser extent than at the ends. The ends of the stiffening element lie adjacent to a portion of the peripheral wall, and the middle region of the stiffening element runs in a middle region of the carrier part.

Advantageously, at most 30% of the surface of the base plate has both on the outer side and on the inner side, in the same wall portion of the base plate, stiffening structures. Preferably, the stiffening structures are provided in at least 70% of the surface of the base plate, either on the outer side or on the inner side, or stiffening structures are provided neither on the inner side nor on the outer side. Advantageously, the first stiffening structure and the second stiffening structure respectively have at least one subregion which in the same wall portion, on the opposite side of the base plate, has no stiffening structure, and which is configured as a continuous region having an area of at least 2 $cm^2$. The subregion advantageously has a length measured in the direction of the x-axis and a width measured in the direction of the y-axis, wherein the length and the width of the subregion are respectively at least 1 cm. The subregion here preferably has in each direction, in side view onto the xy plane, an extent of at least 1 cm.

In order to be able to effectively absorb torsional stresses, it is advantageously provided that the first stiffening structure and the second stiffening structure partially overlap in a wall portion of the base plate. In this wall portion, both stiffening structures on the inner side and stiffening structures on the outer side are hence provided. As a result, a good transmission of forces through the base plate from the outer side to the inner side is enabled. Advantageously, in a direction parallel to the first axis or to the second axis, a first stiffening structure does not lie fully in overlap with a second stiffening structure.

A stiffening structure which on the same wall portion rises from the inner side and from the outer side is advantageously divided into a partial stiffening structure lying on the inner side and a partial stiffening structure lying on the outer side. Partial stiffening structures are regarded as belonging to the same stiffening structure if they lie directly opposite each other, or lie opposite each other within a region having a radius equal to their height. From the individual heights of the partial stiffening structures, which are accounted for with different signs, the net height of the stiffening structure is determined. The net height of the stiffening structures is the sum of the heights, measured parallel to the first axis, of the partial stiffening structures on opposite sides of the same wall portion of the base plate. The partial stiffening structures which extend on the outer side are accounted for with negative signs, and partial stiffening structures which rise onto the inner side are accounted for with positive signs. Hence, the heights of the partial stiffening structures projecting onto the outer side are subtracted from the heights of the partial stiffening structures projecting onto the inner side. If the partial stiffening structures on the outer side are higher than those on the inner side, then a negative net height of the stiffening structure is obtained. It is provided to arrange the stiffening structures such that the net height of stiffening structures which rise to the same space diagonal changes its sign along the space diagonal. At least at one point which has a distance of at most 2 cm to the origin of the coordinate system, the net height is advantageously zero. On both sides of the point at which the net height is zero, the net height can have the same sign. Advantageously, the sign of the net height changes along the space diagonal at most three times, and in particular just once.

The space diagonal is advantageously arranged such that it intersects on the outer side a second stiffening structure and on the inner side a first stiffening structure. The space diagonal hence runs through the stiffening structures or delimits these. The stiffening structures rise from a side face of the base plate to a space diagonal. In this context, the stiffening structure can have regions which do not reach up to the space diagonal and/or have regions which rise beyond the space diagonal. Preferably, the space diagonal intersects the peripheral wall of the carrier part. The peripheral wall here rises, over at least 50% of its length, from the inner side. The peripheral wall advantageously terminates over at least 50% of its length, preferably at least 70% of its length, flush with the base plate. The peripheral wall hence over at least 50% of its length, in particular at least 70% of its length, rises solely from the inner side and not from the outer side.

Advantageously, a first space diagonal forms with the x-axis an angle of 20° to 70°. A second space diagonal forms with the x-axis advantageously an angle of −20° to −70°. The two space diagonals are hence inclined relative to each other by an angle of 40° to 140°. A positive angle is obtained if the angle runs clockwise from the space diagonal to the x-axis. A negative angle is obtained if the angle runs counterclockwise from the space diagonal to the x-axis.

The base plate of the carrier part advantageously has a first opening, through which the drive shaft runs, and a second opening, through which the driven shaft runs. The peripheral wall has a first portion and a second portion, which run on opposite sides of the base plate in the longitudinal direction of the outrigger. The first portion of the peripheral wall is advantageously the portion with positive y-coordinate, and the second portion of the peripheral wall is the portion with negative y-coordinate. Advantageously, at least one stiffening element extends, in the region arranged between the first axis and the second axis, from the first portion of the peripheral wall to the second portion of the peripheral wall. In particular, all stiffening elements which extend along a space diagonal from the outer side to the inner side are arranged between the two axes with respect to the longitudinal direction of the carrier part. The longitudinal direction of the carrier part is here advantageously that direction of the carrier part which lies in the x-direction.

In particular, at least one stiffening element extends in the region between the first axis and the second axis from one of the portions of the peripheral wall to the other portion of the peripheral wall, and from one side of the base plate onto the other side of the base plate, wherein the outer side and the inner side are the two sides of the base plate. The space diagonals intersect the peripheral wall in the direction of view in the direction of the first axis, hence in the region arranged between the axes, in particular in the region arranged in the x-direction between the openings. The stiffening elements hence extend between the axes and, in particular largely, preferably fully between the openings.

Advantageously, the base plate has adjacent to the second opening a region without stiffening structures. The region without stiffening structures advantageously extends from the first portion of the peripheral wall to the second portion of the peripheral wall. The region without stiffening elements decouples the bearing eye for the driven shaft from the, in the direction of the opening for the drive shaft, adjoining region. It has surprisingly been shown that, as a result of the, in this region, reduced stiffness of the carrier part, an increased service life of the carrier part is obtained.

The region without stiffening structures advantageously extends over a circumferential angle around the second opening of at least 60°. The region without stiffening structures advantageously has an area of at least 4 cm². A length, measured parallel to the y-axis, of the region without stiffening structures advantageously amounts to at least 5 cm, in particular at least 8 cm.

In the direction of view in the direction of the first axis, the space diagonal intersects a portion of the peripheral wall in a first interface, and the other portion of the peripheral wall in a second interface. The first interface advantageously has to the first opening a distance of less than the diameter of at least one of the openings. Particularly advantageously, the distance of the first interface to the first opening is less than the diameter of the smaller of the two openings. The distance of the first interface to the first opening is in particular less than the diameter of the first opening. The first interface advantageously has a distance of less than 10 cm, in particular less than 8 cm, to the first opening. The region without stiffening structures runs between the second interface and the second opening. As a result of the arrangement of the region without stiffening structures between the second interface and the second opening, the torsional forces which are to be absorbed are transmitted via the stiffening structures into the peripheral wall, so that no direct force transmission into the bearing eye at the second opening takes place. The first interface is respectively arranged comparatively close to the first opening, so that a good force transmission to the first opening takes place.

The second opening is advantageously configured at a bearing eye which is surrounded by an annular wall. On the annular wall is advantageously arranged a stiffening structure, which extends to the peripheral wall of the carrier part. The stiffening structure is advantageously adjoined by the region without stiffening structures.

At least one stiffening structure advantageously comprises a stiffening rib rising linearly out of the base plate. Preferably, at least one stiffening rib comprises a stiffening pocket rising planarly out of the base plate. A preferred configuration is obtained if at least half of the stiffening pockets rise onto the outer side. In a particularly preferred configuration, all stiffening pockets rise onto the outer side. Via stiffening pockets, a stiffening structure can be created on the outer side in a simple manner, which stiffening structure on the one hand increases the installation space available inside the outrigger, and on the other hand has a low propensity to dirtying on the outer side which is in contact with the environment.

Preferably, the stiffening element comprises at least one stiffening rib and at least one stiffening pocket. Advantageously, at least one of the stiffening structures of stiffening rib and stiffening pocket rises from the inner side of the base plate, and at least one other of the stiffening structures of stiffening rib and stiffening pocket rises from the outer side of the base plate. Particularly preferably, at least one stiffening pocket rises from the outer side of the base plate, and at least one stiffening rib rises from the inner side of the base plate. However, it can also be provided that at least one stiffening pocket rises from the inner side of the base plate, and at least one stiffening rib rises from the outer side of the base plate.

Advantageously, at the first opening is arranged a first bearing eye and at the second opening a second bearing eye, wherein one bearing eye rises predominantly on the inner side, and wherein the other bearing eye rises from the inner side and the outer side of the base plate.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
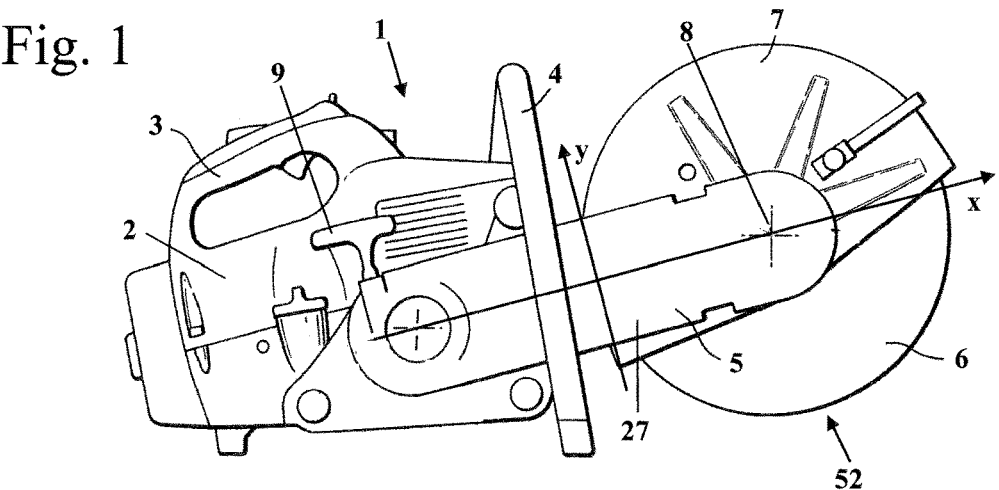
FIG. 1 shows a schematic side view of a cutoff machine.
Figure 2:
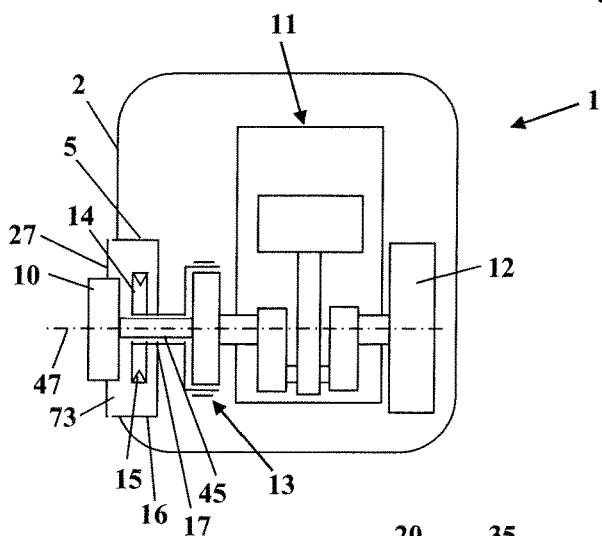
FIG. 2 shows a schematic sectional representation of the cutoff machine from FIG. 1.

FIG. 1 shows a cutoff machine 1 as an embodiment of a handheld work apparatus. The cutoff machine 1 has a motor housing 2, a rearward handle 3, and a forward handle 4 for guiding the cutoff machine 1. However, the cutoff machine 1 can also be mounted on a guide wagon and driven over the floor by the operator. On the motor housing 2 is fixed an outrigger 5, on whose free end, facing away from the motor housing 2, is rotatably mounted a disc-shaped tool, in the embodiment a cutting disc 6. The tool of the cutoff machine 1 is advantageously partially surrounded on its outer periphery by a protective hood 7. The cutting disc 6 is driven rotatingly about a rotational axis 8. For the driving of the cutting disc 6, a drive motor 11 is arranged in the motor housing 2 (FIG. 2). The motor housing 2 is connected by the outrigger 5 to a tool unit 52. The tool unit 52 contains the cutting disc 6 and the protective hood 7. The outrigger 5 has a cover 27 (shown schematically in FIG. 1), which delimits the outrigger 5 to the side facing away from the motor housing 2. For starting the drive motor 11, there is advantageously provided a starter unit 10 (FIG. 2), the starter handle 9 of which, in the embodiment, projects from the motor housing 2 (FIG. 1).

FIG. 2 shows a part of the drive train of the cutoff machine 1. The drive motor 11 is advantageously an internal combustion engine, in particular a two-stroke engine or a mixture-lubricated four-stroke engine. The drive motor 11 is advantageously a single-cylinder engine. The drive motor 11 can also, however, be an electric motor. The drive motor 11 drives via a centrifugal clutch 13 a drive shaft 45. The drive shaft 45 projects through a first opening 17 in the outrigger 5 in an interior space 73 of the outrigger 5. The interior space 73 is delimited by a carrier part 16 secured to the motor housing 2 and by the cover 27 fixed to the carrier part 16. The outrigger 5 is firmly fixed to the motor unit 51. An adjustment of the position of the outrigger 5 in relation to the motor unit 51 is not provided.

Figure 3:
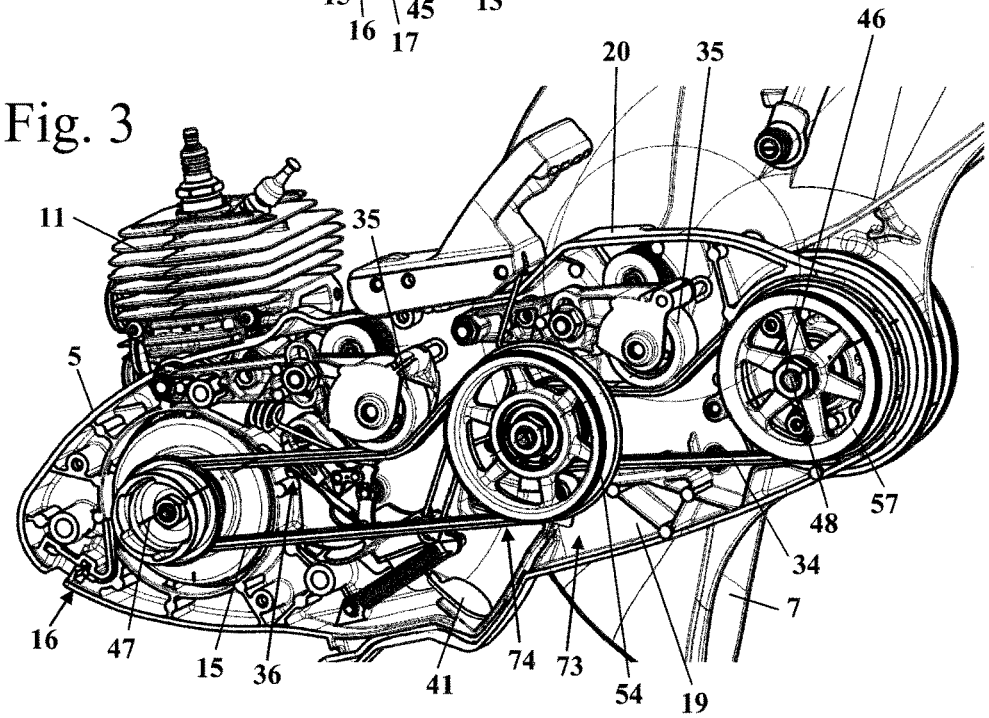
FIG. 3 shows a perspective schematic of the carrier part of the outrigger with belt drive arranged therein.

In the outrigger 5 is arranged a belt pulley 14, which is connected to the drive shaft 45 to rotate therewith and which drive shaft forms the input shaft of a belt drive 74 (FIG. 3). The belt pulley 14 drives a first drive belt 15. On that side of the belt pulley 14 which is facing away from the drive motor 11 is arranged the starter unit 10. The starter unit 10 acts on the drive part of the centrifugal clutch 13, which is connected to the crankshaft of the drive motor 11 so as to rotate therewith. On that side of the drive motor 11, which faces away from the centrifugal clutch 13, is arranged a fan wheel 12 for moving cooling air for the drive motor 11.

FIG. 3 shows the belt drive 74, which is arranged in the outrigger 5 and which transmits the rotating drive motion of the drive motor 11 to a driven shaft 46. To the driven shaft 46, is fixed, in a rotationally secure manner, the cutting disc 6 (FIG. 1).

In FIG. 3, the cover 27 of the outrigger 5 is not shown, but only the carrier part 16 of the outrigger. The carrier part 16 has a base plate 19 and a peripheral wall 20, which extends from the base plate 19 predominantly onto that side of the base plate 19 which is facing away from the drive motor 11. On the side facing away from the drive motor 11, the carrier part 16 is closed off by the cover 27 (FIG. 1) and forms with this the outrigger 5. The cover 27 bears against the peripheral wall 20 and delimits with the base plate and the peripheral wall an interior space 73 of the carrier part.

In the embodiment, the belt drive 74 of the cutoff machine 1 is configured as a two-stage belt drive 74 and comprises, in addition to the drive belt 15, which is also shown schematically in FIG. 2, a further drive belt 34. The drive belt 15 is guided over the belt pulley 14 shown schematically in FIG. 2 and a second, larger belt pulley 54. The further drive belt 34 is guided over a first belt pulley (not shown) arranged, in the view in FIG. 3, behind the belt pulley 54, and over a belt pulley 57. The belt drive 74 is realized as a reduction gear, so that the rotation speed of the driven shaft 46 is lower than that of the drive shaft 45 (FIG. 2). The drive shaft 45 rotates about a first axis 47, and the driven shaft 46 about a second axis 48. The axes 47 and 48 run parallel to each other and approximately perpendicular to the base plate 19. Bearing against the drive belts 15 and 34 are tension rollers 35, which ensure sufficient belt tension.

The cutoff machine 1 advantageously has a brake unit 36, which is likewise shown in FIG. 3.

During operation, the carrier part 16 is exposed to high loads. It has been shown that especially the torsional loads which are generated upon rotation of the second axis 48 in relation to the first axis 47 about the longitudinal center axis of the outrigger 5, that is, about the x-axis shown in FIG. 1, are critical. In order to be able to effectively absorb these loads and at the same time achieve a low weight of the outrigger 5, that configuration of the carrier part 16, which is shown in FIGS. 4 and 5, is provided.

Figure 5:
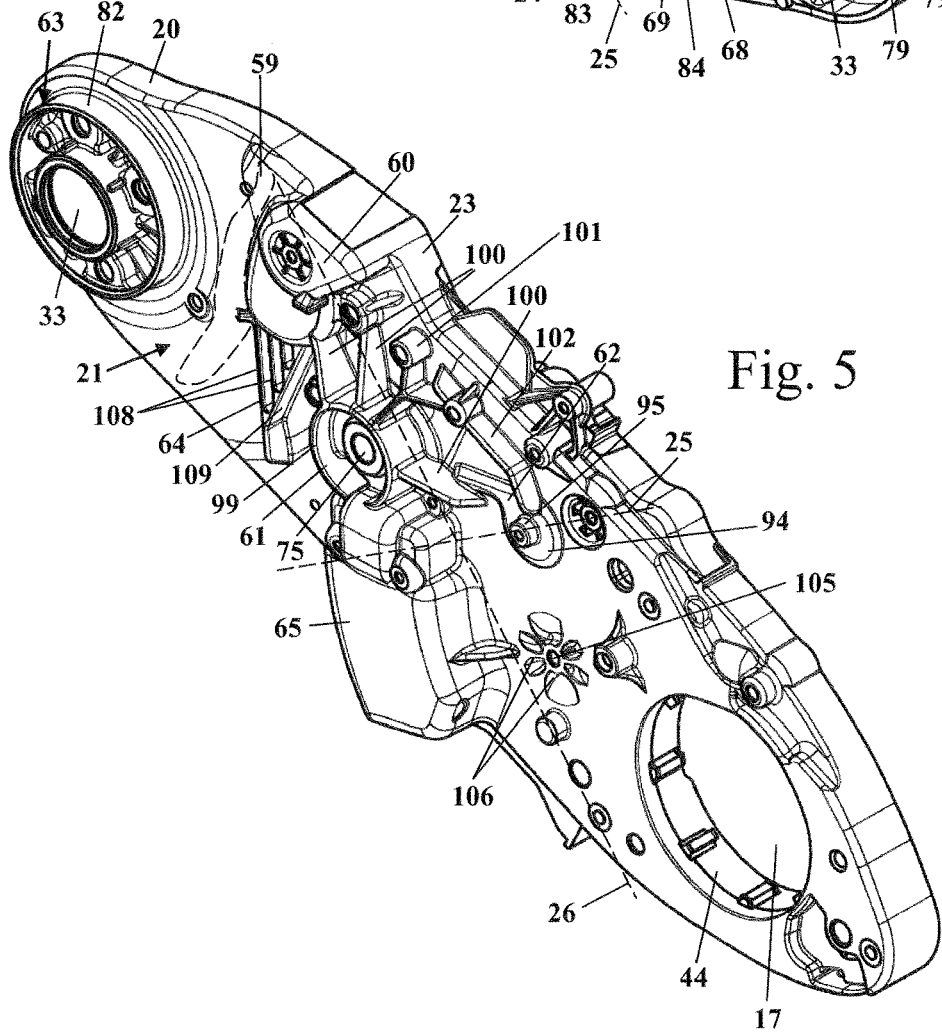
FIG. 5 shows a perspective schematic of the outer side of the carrier part.
Figure 6:
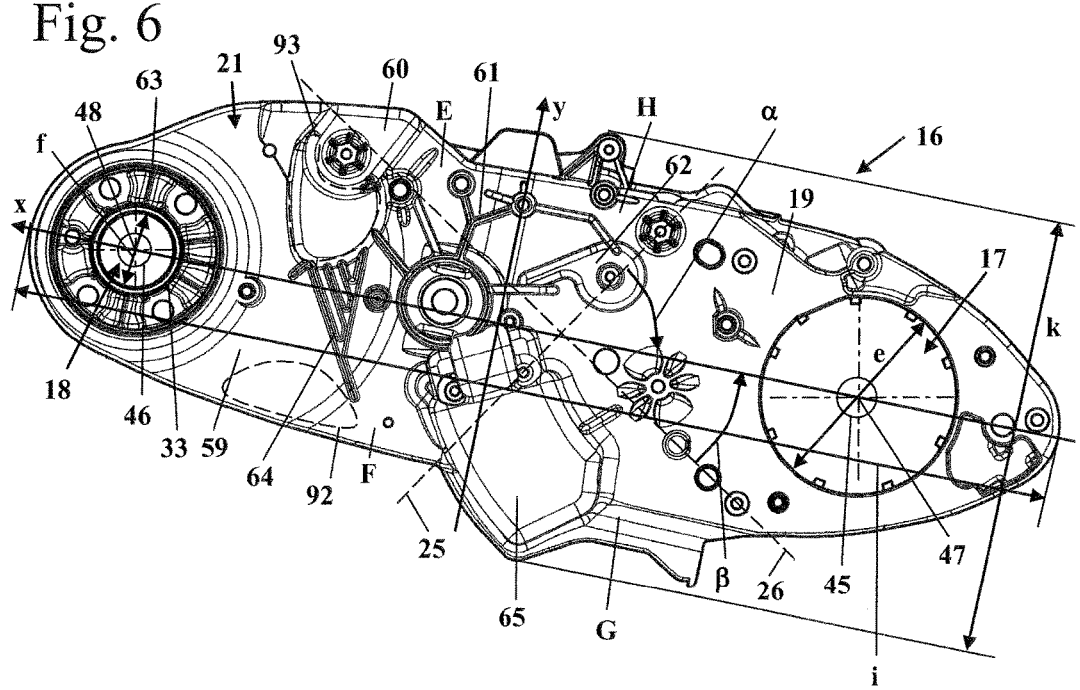
FIG. 6 shows a side view of the outer side of the carrier part parallel to the x-y plane.
Figure 11:
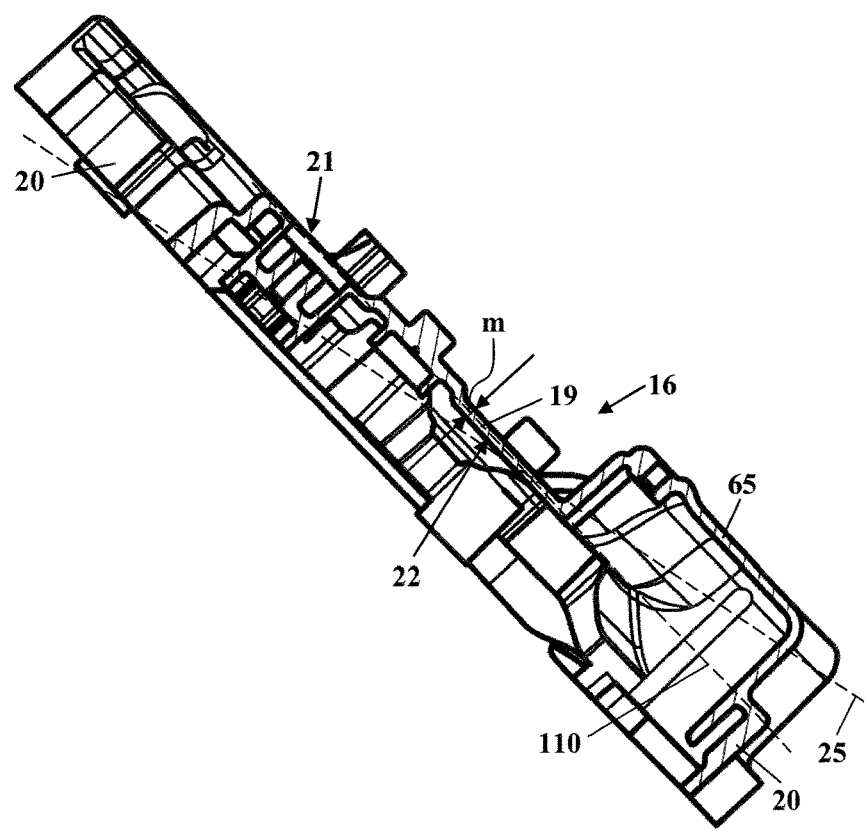
FIG. 11 shows a section view along the line XI-XI in FIG. 7.

The base plate 19 is that plate-shaped part of the carrier part 16 which lies opposite the cover 27. The base plate 19 extends with the greatest part of its surface parallel to the plane of the cutting disc 6, and with the other part of its surface at an angle of less than 30°, in particular less than 20°, to the plane of the cutting disc 6. The base plate 19 has a base plate center plane. The base plate 19 has an inner side 22 (FIG. 4) and an outer side 21 (FIG. 5), midway between which lies the base plate center plane. The carrier part 16 has a carrier part length i, measured in the longitudinal direction of the carrier part 16, and a carrier part height k, measured perpendicular to the longitudinal direction (FIG. 6). The carrier part length i is measured parallel to the x-direction. The carrier part height k is measured parallel to the y-direction. Perpendicular to the base plate center plane, the base plate 16 has a wall thickness m, which is shown in FIG. 11. The wall thickness m is measured between the inner side 22 and the outer side 21 of the base plate 19. The wall thickness m is many times smaller than the carrier part length i and the carrier part height k. Advantageously, the wall thickness m is less than 1 cm, in particular less than 0.5 cm. The outer side 21 of the base plate 19 is advantageously facing toward the motor housing 2 (FIG. 1). The inner side 22 of the base plate 19 is advantageously facing toward the cover 27 (FIG. 1). The carrier part 16 comprises the peripheral wall 20 (FIG. 3), which rises on the periphery of the base plate 19 toward the cover 27. The carrier part 16 bears with a connection region of the outer side of the base plate 19 against the motor housing 2. The connection region extends around the first opening 17 of the base plate 19, as shown by FIG. 5.

Figure 4:
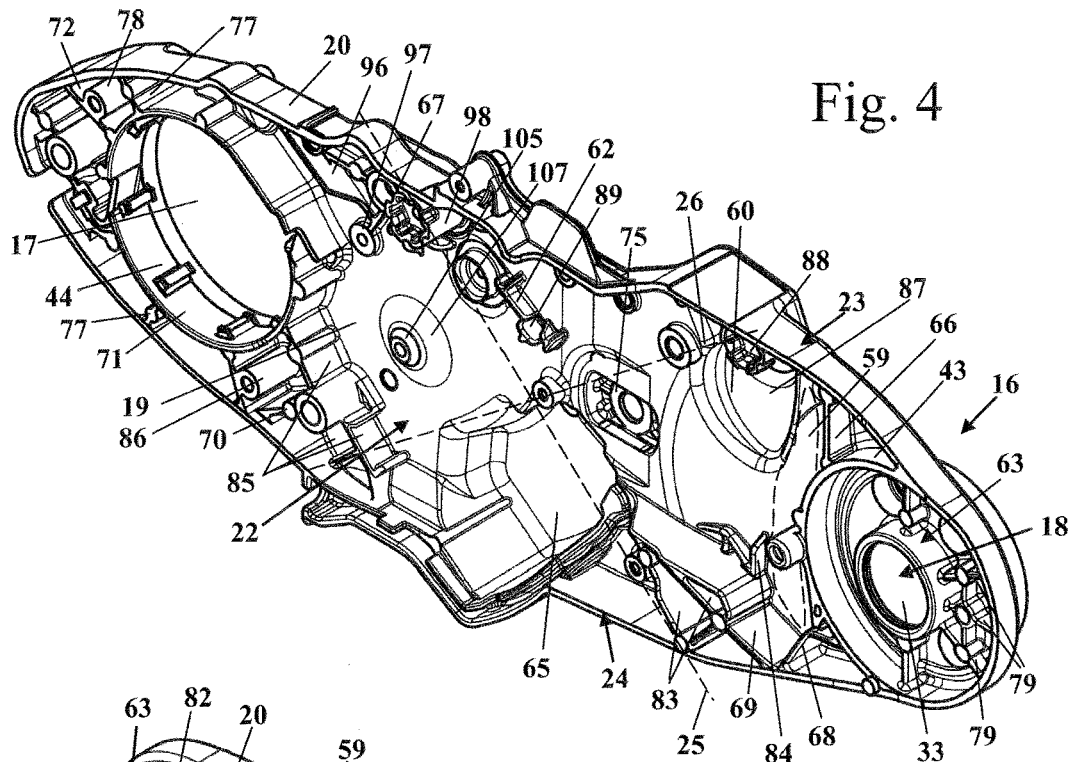
FIG. 4 shows a perspective schematic of the inner side of the carrier part.

FIG. 4 shows a perspective view of the inner side 22 of the base plate 19. The inner side 22 delimits the interior space 73 of the outrigger 5 (FIG. 2). Arranged circumferentially on the base plate 19 is the peripheral wall 20. The peripheral wall 20 rises over the major part of its length solely from the inner side 22 of the base plate 19 in the direction of the cover 27. The peripheral wall 20 rises over at least 50% of its length, in particular at least 70% of its length, solely from the inner side 22. The peripheral wall 20 here protrudes in the regions in which it rises solely from the inner side 22, not from the opposite outer side 21 (FIG. 5). The peripheral wall 20 terminates on the outer side 21 over at least 50%, especially at least 70% of its length, flush with the base plate 19.

The base plate 19 has the opening 17, which is delimited by a delimiting wall 44. The delimiting wall 44 runs cylindrically around the first axis 47 (FIG. 3) and forms a stiffening structure 71. The base plate 19 additionally has a second opening 18 arranged at the free end of the carrier part 16 which projects away from the motor housing 2. The second opening 18 is configured on a hub, which forms a bearing eye 33 and which is surrounded at a distance by an annular inner wall 43. The bearing eye 33 is configured as a cylindrical peripheral wall. Rotatably mounted in the bearing eye 33 is the driven shaft 46 (FIG. 3). The drive shaft 45 (FIG. 2) projects through the first opening 17, and the driven shaft 46 (FIG. 3) through the second opening 18. On that side of the first opening 17, which side is facing away from the second opening 18, a stiffening structure 72 extends between the delimiting wall 44 and the peripheral wall 20. The stiffening structure 72 is formed by stiffening ribs 77 and stiffening eyes 78. Those regions of the base plate 19, which are arranged between stiffening ribs 77 and stiffening eyes 78, are also part of that region of the base plate 19 in which the stiffening structure 72 extends, insofar as the distance between the elements of the stiffening structure is less than 4 cm.

The bearing eye 33 is outwardly surrounded at a radial distance by an inner wall 43, which, starting from the base plate 19, rises annularly on the inner side 22 and, at the free end of the carrier part 16, merges into the peripheral wall 20. Stiffening ribs 79 are provided between the peripheral wall 20 and that semicircular ring of the bearing eye 33 which faces away from the first opening 17. In the semicircular ring facing toward the first opening 17, no stiffening structures, apart from the stiffening ribs 79 delimiting the semicircular ring, are provided between the bearing eye 33 and the inner wall 43. The bearing eye 33 forms with the stiffening ribs 79 and the inner wall 43 a stiffening structure 63. The stiffening structure 63 additionally comprises an outer wall 82, which is shown in FIG. 5 and rises from the outer side 21 of the base plate 19 at a radial distance from the bearing eye 33.

The peripheral wall 20 has a first portion 23, which, in that position of the cutoff machine 1 which is shown in FIG. 1, runs on the top side of the outrigger 5, and a second portion 24, which, in that position of the cutoff machine 1 which is shown in FIG. 1, runs on the bottom side of the outrigger 5. As shown by FIG. 4, extending from the inner wall 43 to the first portion 23 of the peripheral wall 20 is a stiffening structure 66, which is configured as a stiffening rib. A stiffening structure 68, likewise configured as a stiffening rib, extends between the inner wall 43 and the second portion 24 of the peripheral wall 20. The stiffening structures 66, 63 and 68 are adjoined by a region 59 without stiffening elements. The region 59 without stiffening structures is arranged contiguous to the annular inner wall 43. On the second portion 24 of the peripheral wall 20, a stiffening structure 69, which is formed by a plurality of stiffening ribs 83, is configured contiguous to the region 59 without stiffening elements. The stiffening ribs 83 form with the stiffening rib 68 a lattice-like stiffening structure, which is interrupted by the region 59. The stiffening ribs 83 of the stiffening structure 69 are arranged close to the peripheral wall 20 in order to leave sufficient installation space for the drive belt 34 (FIG. 3). The height of the stiffening ribs 83 corresponds to the height of the contiguous region of the peripheral wall 20. The stiffening structure 69 has stiffening ribs 84 of reduced height, which run between the drive belt 34 and the base plate 19, as shown by FIGS. 3 and 4.

In a middle region between the openings 17 and 18 is configured, adjacent to the second portion 24 of the peripheral wall 20, a stiffening structure 65, which, as shown also by FIG. 5, is configured as a stiffening pocket which rises planarly from the outer side 21 of the base plate 19. The stiffening pocket 65 receives a component 41 of the brake unit 36, as shown by FIG. 3. The component 41 moves between the actuated and the unactuated position of the brake unit 36 within the stiffening pocket 65. On the side facing toward the first portion 23 of the peripheral wall 20 is arranged adjacent to the stiffening pocket 65 a bearing eye 75, which serves for the mounting of the belt pulley 54 (FIG. 3). The bearing eye 75 rises likewise from the outer side 21, as shown by FIG. 5.

Between the stiffening structure 65 and the delimiting wall 44 at the first opening 17, the second portion 24 of the peripheral wall 20 is adjoined by a stiffening structure 70, which is formed by stiffening ribs 85 and stiffening eyes 86. The stiffening eyes 86 are of annular configuration.

Adjacent to the first portion 23 of the peripheral wall 20 is arranged, contiguous to the region 59 without stiffening structure, a stiffening structure 60, which is formed by a stiffening pocket 87 and a bearing dome 88 arranged in the stiffening pocket 87. The bearing dome 88 serves for the mounting of a tension roller 35 (FIG. 3). As shown by FIG. 5, the stiffening structure 60 rises from the outer side 21. Between that stiffening pocket 87 of the stiffening structure 60 which is arranged on the outer side 21 and the stiffening structure 69 arranged on the inner side 22 on the lower portion 24 of the peripheral wall 20, a further stiffening structure 64 is arranged only on the outer side, and not on the inner side 22. In the interior space 73, the second drive belt 34 runs in this region, as shown by FIG. 3.

In an approximately middle region between the openings 17 and 18, adjacent to the first portion 23 is arranged a stiffening structure 62 comprising stiffening ribs 89 which rise from the inner side 22 into the interior space 73 (FIG. 2). As shown, in particular, by FIG. 5, the stiffening structure 62 also comprises a stiffening pocket 94, which rises from the outer side 21, and a stiffening eye 95, which is arranged in the stiffening pocket 94 and which likewise rises from the outer side 21.

Between the stiffening structure 62 and the delimiting wall 44, a stiffening structure 67 is arranged on the first portion 23 of the peripheral wall 20, as shown by FIG. 4. The stiffening structure 67 comprises stiffening ribs 96, stiffening eyes 97, and a bearing dome 98, which serves for the mounting of the second tension roller 35 (FIG. 3). The stiffening structure 67 here does not project up to the delimiting wall 44 at the first opening 17, but has a distance therefrom.

Between the stiffening structures 62 and 67 on the first portion 23 of the peripheral wall 20 and the stiffening structures 65 and 70 on the opposite second portion 24 of the peripheral wall 20 extends a region in which substantially no stiffening structures are arranged on the inner side 22 of the base plate 19. In this region, only a bearing dome 105 for the mounting of the lever arrangement 39 is arranged. The bearing dome 105 is arranged on a frustoconical elevation 107 of the base plate 19. As shown by FIG. 5, on the elevation 107 are arranged stiffening ribs 106, which extend within the elevation 107 on the outer side 21 to the bearing dome 105.

As shown by FIG. 5, on the outer side 21 of the base plate 19 between the stiffening structure 65 and the first portion 23 of the peripheral wall 20 is arranged a stiffening structure 61. The stiffening structure 61 comprises the bearing eye 75, on which the belt pulley 54 (FIG. 3) is mounted. Extending around the bearing eye 75 is a cylindrical stiffening rib 99, from which further stiffening ribs 100 project outward in a roughly radial direction to the bearing eye 75. The stiffening structure 61 additionally comprises stiffening eyes 101, which adjoin the stiffening ribs 100, and a stiffening rib 102, which extends roughly in the longitudinal direction of the carrier part 16, following the course of the peripheral wall 20, in the direction of the first opening 17.

The stiffening structure 60 is adjoined by a stiffening structure 64, which is formed by stiffening ribs 108, 109. The stiffening ribs 108 are here advantageously arranged parallel to one another and are connected by an obliquely running stiffening rib 109, so that a triangular arrangement is obtained. The outer of the stiffening ribs 108 is lengthened, in relation to the stiffening rib 109, in the direction of the second portion 24 (FIG. 4) of the peripheral wall 20. The stiffening ribs 108 and 109 rise from the outer side 21. By virtue of its lengthened stiffening rib 109, the stiffening structure 64 of the outer side partially overlaps with the stiffening structure 69 arranged on the inner side 22 on the second portion 24.

Figure 7:
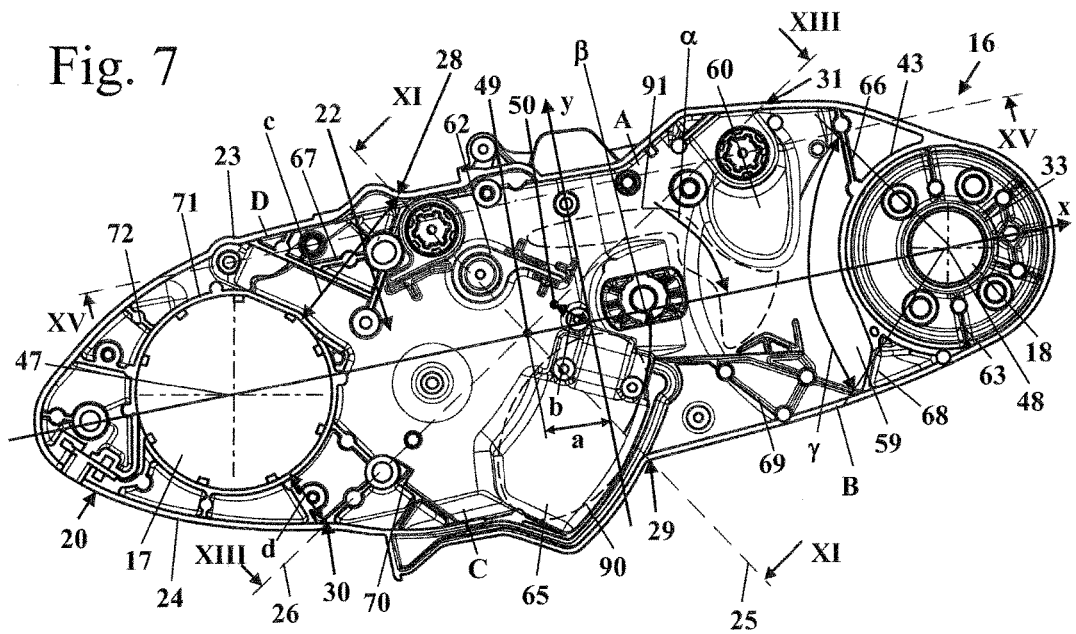
FIG. 7 shows a side view of the inner side of the carrier part parallel to the x-y plane.

As is also shown by FIG. 5, in the region 59 without stiffening structures, there is also no stiffening structure arranged on the outer side 21. On the outer side 21, the region 59 without stiffening elements runs between the outer wall 82 of the stiffening structure 63 and the stiffening structures 60 and 64. As shown by FIG. 7, the region 59 without stiffening elements extends over an angle γ on the inner side 22 around the inner wall 43 between the stiffening structures 66 and 68, which angle advantageously amounts to at least 60°. In the embodiment, the angle γ is 70° to 110°. The region 59 without stiffening structures advantageously has a length of at least 5 cm, in particular at least 8 cm, which is measured, in particular, tangentially to the opening 18. Over a length of at least 4 cm, the width of the region 50 is advantageously at least 1 cm at any point. The area of the region 59 without stiffening structures advantageously amounts to at least 4 cm$^2$, in particular at least 8 cm$^2$.

In order to achieve a good absorption of the torsional forces generated during operation, the stiffening structures 65, 62 and 67 rise out of the base plate plane to a first space diagonal 25, and the stiffening structures 60, 61, 70 to a second space diagonal 26. Both space diagonals 25, 26 intersect the carrier part 16 in the middle part, located between the openings 17, 18, of the carrier part 16. A space diagonal 25, 26 is a straight line which in any direction of view parallel or perpendicular to the first axis 47 forms an angle with the base plate plane. The space diagonals 25 and 26 are shown schematically in FIGS. 4 and 5. As shown by FIG. 6, the space diagonal 25 intersects the stiffening structures 65 and 62 on the outer side 21, and, as shown by FIG. 7, the stiffening structure 67 on the inner side 22. The space diagonal 26 intersects on the outer side 21 the stiffening structure 60 and the stiffening structure 61 and runs on the inner side 22 through the stiffening structure 70. The position of the space diagonals 25 and 26 is explained below on the basis of a two-dimensional, Cartesian coordinate system. The Cartesian coordinate system comprising an x-axis and a y-axis is defined in a direction of view onto the carrier part 16 in the direction of the first axis 47, in which the outrigger 5 lies in front of the motor housing 2 (FIG. 1). In the side view shown in FIGS. 6 and 7, the first axis 47 and the second axis 48 are connected by a connecting line, which forms the x-axis of the coordinate system. The x-axis is here directed from the first axis 47 to the second axis 48. The y-axis of the coordinate system is arranged perpendicular to the connecting line and runs midway between the first axis 47 and the second axis 48. The y-axis hence intersects the connecting line of the axes 47 and 48 centrally.

Figure 8:
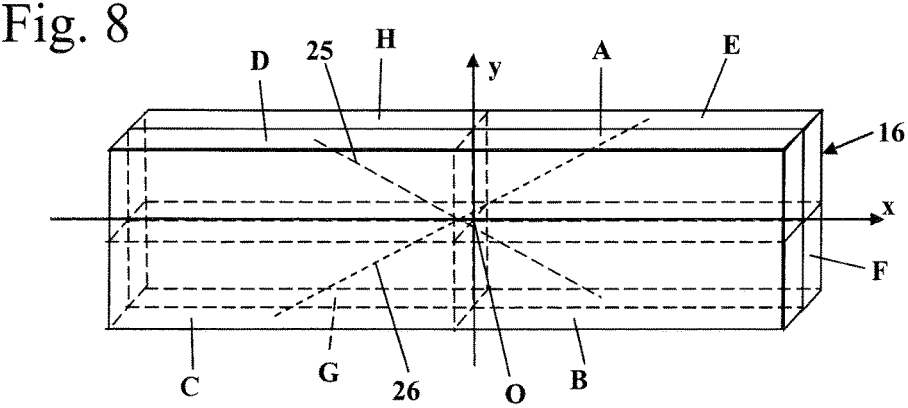
FIG. 8 shows a schematic of the division of the carrier part into segments.

The Cartesian coordinate system consisting of x-axis and y-axis has four sectors or quadrants, which are defined by the positive x-axis and the positive y-axis, the positive x-axis and the negative y-axis, the negative y-axis and the negative x-axis, and the positive y-axis and the negative x-axis. To these four sectors of the coordinate system is respectively assigned a segment A, B, C, D on the inner side 22 of the carrier part 16, as shown by FIG. 7. As shown by FIG. 6, to the sectors of the coordinate system are assigned on the outer side 21 the four segments E, F, G, H. The arrangement of the sectors of the coordinate system and of the segments A-H is shown schematically in FIG. 8. The origin O of the coordinate system is arranged in the base plate 19 between the inner side 22 and the outer side 21, and midway between the first axis 47 and the second axis 48. As shown by FIG. 6 in conjunction with FIG. 7 and FIG. 8, the first space diagonal 25 runs from the segment F on the outer side 21 to the segment D on the inner side 22. The second space diagonal 26 runs from the segment E on the outer side 21 to the segment C on the inner side 22. The first space diagonal 25 here traverses also a region of the segment G, and the second space diagonal 26 traverses the segment H. A subregion is a region, arranged on one side of the base plate 19, of the carrier part 16, which region lies opposite a stiffening structure on the other side of the base plate 19 and does not itself have a stiffening structure. As shown by FIG. 7, to the stiffening structure 65 on the inner side 22 is assigned a subregion 90, since the wall portion has only one stiffening pocket rising from the outer side 21. A stiffening structure which rises on the same wall portion from the inner side 22 is not provided. On the inner side 22 is provided a further subregion 91, which has no stiffening structure on the inner side. On the outer side 21 are arranged in this region the stiffening structures 64 and 61. As shown by FIG. 6, to the stiffening structure 60 is assigned on the inner side 22 a subregion 93, which has a stiffening structure only on the outer side 21. The other side of the wall portion, that is, the corresponding region of the opposite side of the base plate, has no stiffening structure rising from the inner side 22. A subregion 92 is arranged on the opposite side of the stiffening structure 69 (FIG. 7). On one side of the wall portion is arranged the subregion 92, and on the other side the stiffening structure 69. On the outer side 21, no stiffening structure is arranged in the subregion 92. At most 30% of the area of the base plate 19 has stiffening structures both on the outer side 21 and on the inner side 22 in the same wall portion of the base plate 19.

The subregions 90, 91, 92 and 93 respectively have an area of at least 2 cm$^2$. The extent, measured in the x-direction, and the extent, measured in the y-direction, of the subregions 90, 91, 92 and 93 is respectively at least 1 cm. Advantageously, all subregions which have a stiffening structure on the opposite side of the base plate have an area of at least 2 cm$^2$, and a length and width of respectively at least 1 cm. Subregions are consequently regions of the base plate which have stiffening structures only on one side of the base plate 19.

The subregions, of which the subregions 90, 91, 92 and 93 are shown by way of example, and regions without any stiffening structures extend over at least 70% of the surface of the base plate 19. As a wall portion with stiffening structures are considered wall portions of the base plate 19 which bear a stiffening structure or are arranged between two elements of a stiffening structure which have a distance apart of less than 4 cm. In the case of a wall portion which bears stiffening ribs of a stiffening structure, the regions lying between the stiffening ribs are hence also considered as part of the stiffening structure if the stiffening ribs have a distance apart of less than 4 cm.

As shown by FIG. 6, the space diagonal 25 forms with the x-axis, in a direction of view in the direction of the first axis 47, an angle α which amounts to 20° to 70°. The angle α advantageously amounts to 30° to 60°. A positive angle α is obtained if the angle runs clockwise from the space diagonal 25 to the x-axis. The space diagonal 26 is inclined to the opposite direction and forms with the x-axis an angle β (FIG. 7) of −20 to −70°. A negative angle β is obtained if the angle runs counterclockwise from the space diagonal 26 to the x-axis. The space diagonal 26 here extends predominantly in the sector having positive values of the x-axis and positive values of the y-axis, and the sector having negative x-values and negative y-values. The first space diagonal 25 extends predominantly in the sector having positive x-values and negative y-values and the sector having negative x-values and positive y-values.

The space diagonals 25 and 26 extend in the region enclosed by the peripheral wall 20, substantially between the openings 17 and 18. In a direction of view in the direction of the first axis 47, as shown in FIG. 7, the first space diagonal 25 intersects the first portion 23 of the peripheral wall 20 in an interface 28 and the second portion 24 of the peripheral wall 20 in a second interface 29. The x-coordinate of the interfaces 28 and 29 has a lesser value than the x-coordinate of the respective openings 17 and 18. The interfaces 28 and 29 lie in the longitudinal direction between the axes 47 and 48 and between the openings 17 and 18. The coordinate origin O lies in the longitudinal direction between the axes 47 and 48 and between the interfaces 28 and 29. Viewed transversely to the longitudinal direction, the interfaces 28 and 29 lie outside the openings 17 and 18.

The second space diagonal 26 intersects the second portion 24 of the peripheral wall 20 in a first interface 30 and the first portion 23 of the peripheral wall 20 in a second interface 31. The second interface 31 lies in the x-direction between the openings 17 and 18. The first interface 30 lies in the x-direction between the axes 47 and 48. The first interface 30 lies, however, no closer to the origin O of the coordinate system than does the first opening 17. The first interface 30 has a distance d to the opening 17 which is less than 10 cm. Advantageously, the distance d is less than 5 cm. The first interface 28 of the first space diagonal 25 has a distance c to the opening 17 which advantageously is likewise less than 10 cm, in particular less than 8 cm.

The first opening 17 has a diameter e and the second opening 18 has a diameter f, as shown by FIG. 6. The diameter f is significantly smaller than the diameter e. The distance c (shown in FIG. 7) of the first interface 28 to the first opening 17 is less than the diameter e of the opening 17, and advantageously is also smaller than the diameter f of the second opening 18.

Figure 9:
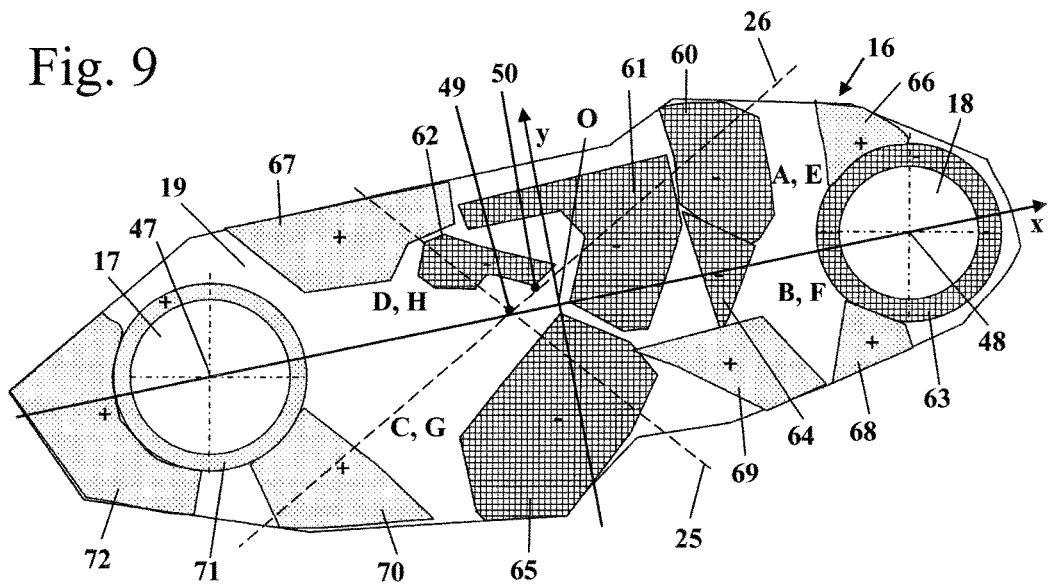
FIG. 9 shows a schematic of the carrier part in side view, with schematic representation of the stiffening structures.
Figure 10:
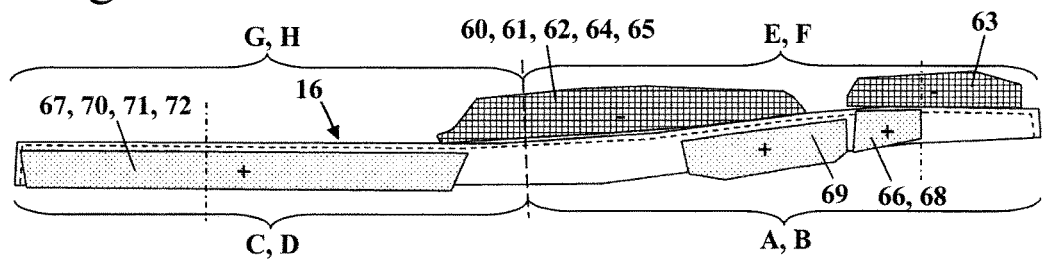
FIG. 10 shows a schematic representation of the stiffening structures of the carrier part in a view from above.

FIGS. 9 and 10 show the arrangement of the stiffening structures 60 to 72 in schematic representation. Here, the net height of stiffening structures lying one above another is respectively accounted for. The net height is the sum of the heights, measured parallel to the first axis 47, of partial stiffening structures on opposite sides of the same wall portion of the base plate. Partial stiffening structures which rise from the outer side are here accounted for with negative signs, and partial stiffening structures which rise from the inner side with positive signs. The net height of a stiffening element formed by stiffening structures which rise to the same space diagonal changes its sign along the space diagonal. In the region of the negative x-axis, which region is advantageously facing toward the drive motor 11 (FIG. 2), are predominantly arranged first stiffening structures, that is, stiffening structures which rise from the inner side 22. In that region of the positive x-axis which is advantageously facing toward the tool are predominantly arranged second stiffening structures, that is, stiffening structures which rise from the outer side 21.

Figure 12:
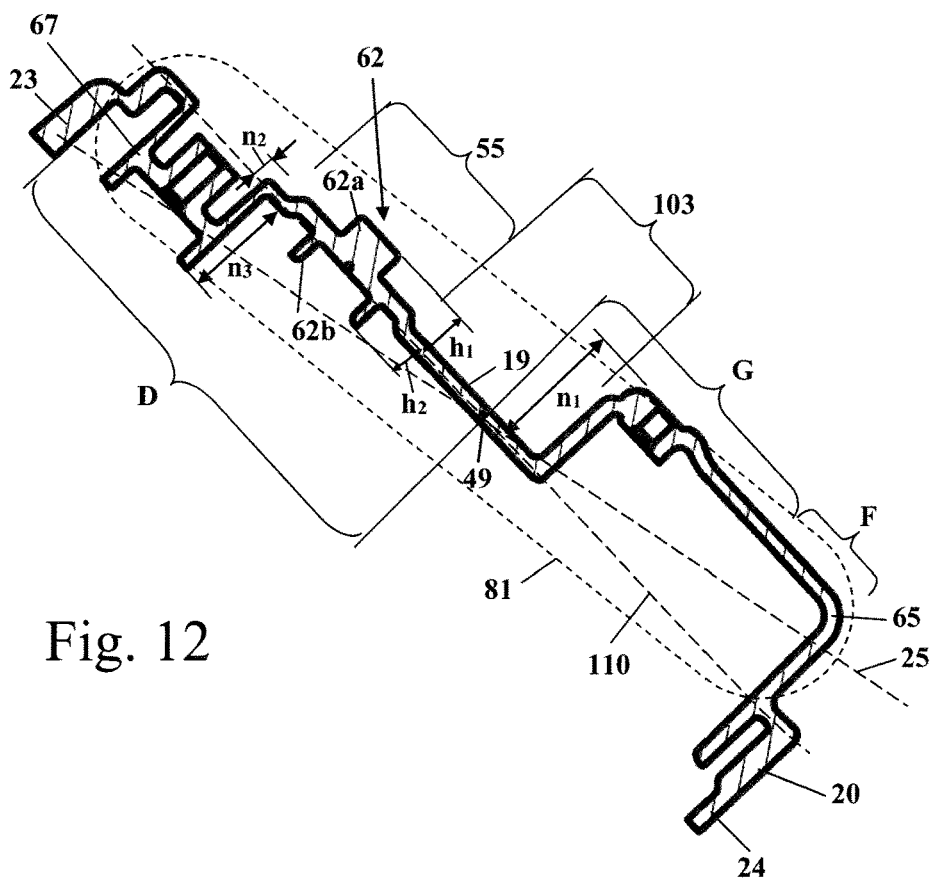
FIG. 12 shows a sectional plane from FIG. 11 along spatial diagonal 25.

The stiffening structures 67, 62 and 65 form a stiffening element 81, which is shown in FIGS. 11 and 12. FIGS. 11 and 12 show a section along the first space diagonal 25 and perpendicular to the xy plane. The space diagonal 25 here intersects the stiffening structure 65, the base plate 19 and the stiffening structure 67, as well as, adjacent to the stiffening structure 67, the first portion 23 of the peripheral wall 20. The stiffening element 81 extends from the first portion 23 to the second portion 24 of the peripheral wall 20. In FIG. 12 are also shown in schematic representation the sectors F, G and D, through which the shown section and the space diagonal 25 run. The stiffening element 81 has, at least at a point 49, a net height of zero. In the embodiment, the point 49 is the point of intersection with the x-axis. The point 49 can, however, also be distanced from the x-axis and the y-axis. In the embodiment, the stiffening element 81 has, over a comparatively wide middle region 103, a net height of zero. In the embodiment, the net height of the stiffening structures on both sides of the region 103 is negative. Both the stiffening structure 65 and the stiffening structure 62 extend predominantly on both sides of the point of intersection of the space diagonal 25 with a base plate plane 110 from the outer side 21 (FIG. 11), yet in different measure.

The values of the net heights of the stiffening structures advantageously increase along the space diagonals 25, 26 in the direction of the portions 23, 24 of the peripheral wall 20, and decrease in the direction of the point of intersection of the space diagonals 25, 26 with the base plate plane 110.

The stiffening structure 62 is arranged in a wall portion 55 in which both partial stiffening structures 62a, which rise from the outer side 21, and partial stiffening structures 62b, which rise from the inner side 22, are provided. In the wall portion 55, partial stiffening structures 62a, 62b from opposite sides 21, 22 of the base plate 19 thus overlap. The partial stiffening structures 62a, 62b jointly form the stiffening structure 62. The partial stiffening structures 62a have a height $h_1$, which is measured parallel to the first axis 47 (FIG. 7). The partial stiffening structures 62b have a height $h_2$, which is somewhat less than the height $h_1$. This gives a net height $n_2$ as the sum of the heights $h_1$ and $h_2$, wherein the height $h_1$ is accounted for with negative, and the height $h_2$ with positive sign. The net height $n_2$ is hence negative. All heights and net heights are measured to a base plate plane 110. The base plate plane 110 is the center plane of the base plate 19 and runs midway between outer side 21 and inner side 22. Regions of the carrier plate 16 which are inclined by more than 30° in relation to the cutting disc 6 or to a perpendicular plane to the first axis 47, or have a wall thickness of more than 1 cm, constitute no part of the base plate 19. Advantageously, stiffening structures linearly adjoin the inner side 22 or the outer side 21 of the base plate 19. The base plate 19 has in the region of the stiffening pockets a gap, so that the stiffening pockets make contact with the base plate 19 only at their periphery. Within the gap, the base plate plane 110 reflects that course of the base plate 19 which it would have if it were not interrupted in this region (see, for instance, FIG. 12).

The stiffening structure 65 has a negative net height $n_1$, which corresponds to the height, measured parallel to the first axis 47, of the stiffening structure 65 with negative sign. The stiffening structure 67 has a positive net height $n_3$, which likewise corresponds to the actual height, measured up to the base plate plane 110, of the stiffening structure 67. The stiffening structure 62 has a negative net height $n_2$, which corresponds to the mean value of the heights of the partial stiffening structures 62a and 62b.

The point 49 at which the net height amounts to zero is advantageously arranged close to the origin O of the coordinate system, as shown by FIGS. 7 and 9. As shown by FIG. 7, the point 49 has a distance a to the origin O which is advantageously less than 2 cm. The base plate 19 has a middle part, which lies centrally in the base plate 19 between the first opening 17 and second opening 18 and between the first portion 23 and the second portion 24 of the peripheral wall 20, and which neither on the inner side 22 nor on the outer side 21 bears a stiffening structure.

Figure 13:
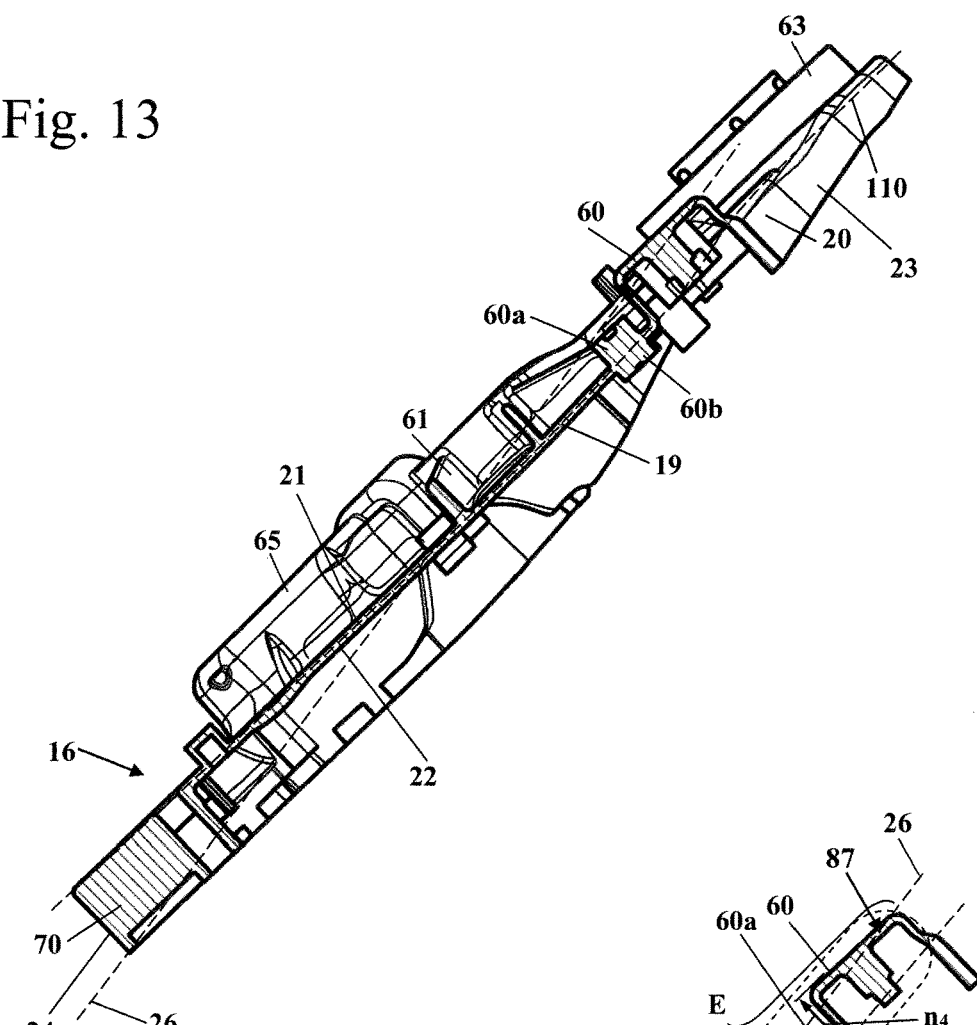
FIG. 13 shows a section along the line XIII-XIII in FIG. 7.
Figure 14:
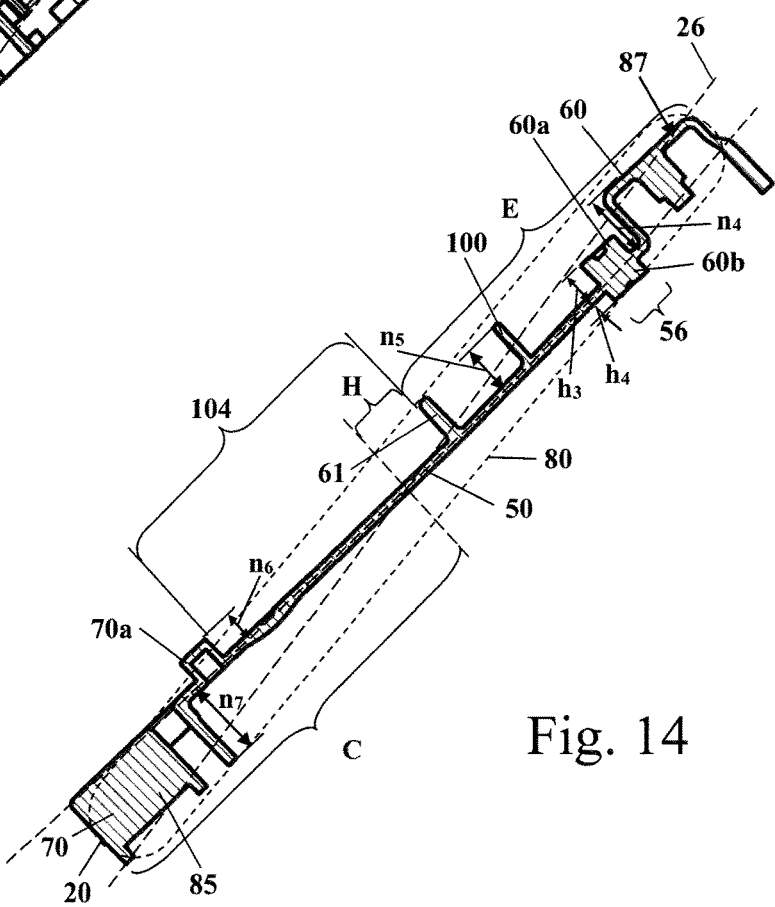
FIG. 14 shows a representation of the sectional plane from FIG. 13.

Rising to the second space diagonal 26 are the stiffening structures 60, 61 and 70, as shown by FIG. 9. FIGS. 13 and 14 show a section along the space diagonal 26 and perpendicular to the xy plane. As shown by FIGS. 13 and 14, the stiffening structures 60, 61 and 70 form a stiffening element 80, which extends spatially diagonally through the carrier part 16. The stiffening element 80 here extends from the first portion 23 of the peripheral wall 20 and the outer side 21 to the second portion 24 of the peripheral wall 20 and the inner side 22, and connects the two portions 23, 24 to each other spatially diagonally. As shown by FIG. 14, the stiffening structure 60 has a net height $n_4$, which, due to the arrangement of the stiffening structure 60 on the outer side, is negative. In a wall portion 56, partial stiffening structures 60a are arranged on the outer side 21 and partial stiffening structures 60b on the inner side 22 (FIG. 13), which partial stiffening structures form parts of the stiffening structure 60. The partial stiffening structures 60a and 60b overlap in the wall portion 56. The partial stiffening structure 60a has a height $h_3$, which is accounted for with negative sign and is measured perpendicular to the xy plane up to the base plate plane 110. The partial stiffening structure 60b has a height $h_4$, which is accounted for with positive sign. The height $h_3$ has a slightly greater value than the height $h_4$, so that, all in all, a negative net height is obtained in this region. The stiffening structures 61 have a net height $n_5$, which is likewise negative. The stiffening structure 70 comprises a partial stiffening structure 70a on the outer side 21 having a net height $n_6$, and a stiffening structure 70, arranged in a contiguous wall portion, having a net height $n_7$. In the middle part of the base plate 19, the net height, at least at a location 50 between two stiffening structures 61, 70a belonging to the stiffening element 80, amounts to zero. FIGS. 7 and 9 show the position of the location 50. The location 50 has to the origin O of the coordinate system a distance b, which is very small. The distance b is advantageously less than 2 cm. In the middle part of the base plate 19, the net height, in a region 104 extending between two stiffening structures 61 and 70 belonging to the stiffening element 80, advantageously amounts to zero.

As shown by FIG. 14, the space diagonal 26 intersects the stiffening structure 60 adjacent to the peripheral wall 20. The space diagonal 26 intersects the first portion 23 of the peripheral wall 20 at the stiffening structure 60 and the second portion 24 at the stiffening structure 70.

As is also shown by FIGS. 12 and 14, the net height of the stiffening structures 67 and 65, or 70 and 60, which follow one upon the other along a space diagonal 25, 26, decreases in its value, until finally the sign reverses. The net heights $n_3$ and $n_1$, or $n_7$ and $n_4$, of the stiffening structures 67 and 65, or 70 and 60, which rise to a common space diagonal 25 or 26 and are arranged close to the peripheral wall 20, is respectively greater than the net height $n_2$ or $n_5$ of a stiffening structure 62 or 61 which rises to the same space diagonal 25 or 26 close to the connecting line. The net height of the stiffening structure 67 or 70 which rises to a space diagonal 25, 26 close to one portion 24 of the peripheral wall 20 has an opposite sign to the net height of a stiffening structure 65 or 60 which rises to the same space diagonal 25, 26 close to the other portion 24 of the peripheral wall 20.

Figure 15:
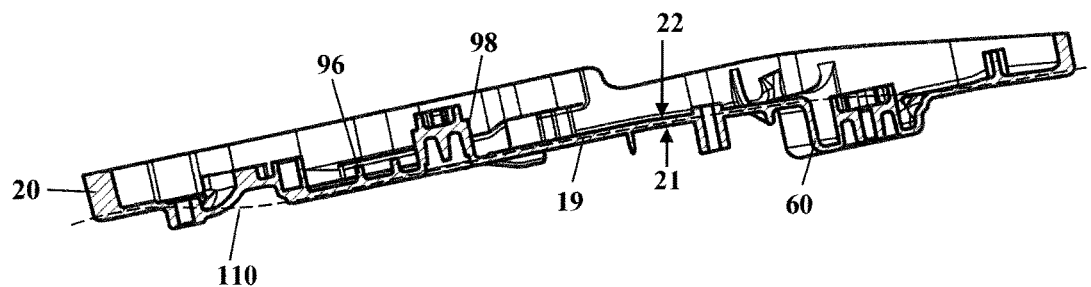
FIG. 15 shows a section along the line XV-XV in FIG. 7.
Figure 16:
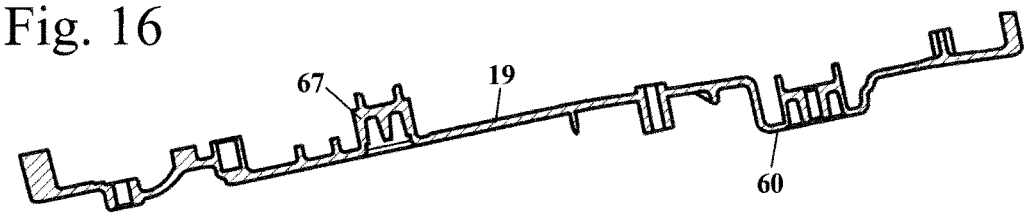
FIG. 16 shows a view of the sectional plane from FIG. 15.

FIGS. 15 and 16 show an eccentric longitudinal section through the carrier part 16. At that end region of the carrier part 16 which lies close to the motor, the base plate 19 has on its outer side 21 a substantially flat connection region, with which the carrier part 16 bears against the motor housing 2 (FIG. 1). In that end region of the carrier part 16 which lies close to the tool, the base plate 19 is slightly curved toward the plane of the cutting disc 6 (FIG. 1). The outer side 21 of the carrier part 16 has at the end close to the tool a lesser distance to the plane of the cutting disc 6 than at the end close to the motor.

Stiffening ribs are understood to be stiffening structures which rise linearly out of the base plate 19, while stiffening pockets rise planarly out of the base plate 19. Advantageously, more than half of the stiffening pockets rise from the outer side 21. In the embodiment, all stiffening pockets 65, 87, 94 rise from the outer side 21. The stiffening elements 80 and 81 comprise as stiffening structures respectively at least one stiffening pocket and one stiffening rib, wherein the stiffening structures of a stiffening element rise from opposite sides of the base plate 19 or of the base plate plane 110.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:
a motor unit;
a work tool unit;
an outrigger connected to said work tool unit;
said outrigger including a carrier part;
said carrier part having a base plate defining an inner side and an outer side facing toward said motor unit;
said base plate having a periphery;
said carrier part including a peripheral wall at said periphery for delimiting said base plate;
said peripheral wall having a predetermined length and being configured to rise exclusively from said inner side of said base plate over at least 50% of said predetermined length;
a drive shaft running rotatably driven about a first axis transverse to said base plate;
a driven shaft running parallel to said drive shaft and being rotatably journalled about a second axis;
said carrier part defining a coordinate system having an x-axis, a y-axis and an origin (O);
said x-axis defining a connecting line interconnecting said first and second axes when viewed onto said carrier part along said first axis;
said y-axis being arranged perpendicularly to said connecting line and to said first axis and to run midway between said first axis and said second axis;
said coordinate system having four quadrants on said inner side and four quadrants on said outer side with first segments (A, B, C, D) of said carrier part being disposed in corresponding ones of said inner side four quadrants and second segments (E, F, G, H) of said carrier part being disposed in corresponding ones of said outer side four quadrants;
said carrier part having at least one spatial diagonal which runs through one of the segments on said outer side and one of said segments on said inner side with said one segment on said outer side lying opposite to said one segment on said inner side with reference to said origin (O) of said coordinate system;
at least a first reinforcement structure rising from said inner side of said base plate to said one spatial diagonal; and,
at least a second reinforcement structure rising from said outer side of said base plate to said one spatial diagonal so as to cause said first reinforcement structure and said second reinforcement structure to conjointly define a spatial diagonal composite reinforcement structure.

2. The portable handheld work apparatus of claim 1, wherein at most 30% of the surface of said base plate on both said inner side and said outer side has reinforcement structures in the same wall section of said base plate.

3. The portable handheld work apparatus of claim 1, wherein said first reinforcement structure and said second reinforcement structure each have a part region which has no reinforcement structure and is configured as a continuous region having a surface content of at least 2 $cm^2$; and, the part regions are arranged in the same wall section on respective opposite-lying sides of said base plate.

4. The portable handheld work apparatus of claim 1, further comprising first and second partial stiffening structures; and, wherein said first and second reinforcement structures have a net height ($n_1, n_2, n_3, n_4, n_5, n_6, n_7, n_8, n_9$); said net height ($n_1, n_2, n_3, n_4, n_5, n_6, n_7, n_8, n_9$) is the sum of the heights ($h_1, h_2, h_3, h_4$) of said first and second partial stiffening structures on mutually opposite-lying sides of one and the same wall section of said base plate with said heights ($h_1, h_2, h_3, h_4$) being measured parallel to said first axis; said second partial stiffening structure rises on said outer side of said base plate and is considered with a negative sign; said first partial stiffening structure rises on said inner side of said base plate and is considered with a positive sign; and, the net height ($n_1, n_2, n_3, n_4, n_5, n_6, n_7, n_8, n_9$) of said first and second reinforcement structures, which rise to said spatial diagonal, change sign along said spatial diagonal and are zero in at least one point having a distance (a, b) of at most 2 cm to said origin (O) of said coordinate system.

5. The portable handheld work apparatus of claim 1, wherein said one spatial diagonal is a first spatial diagonal; and, said first spatial diagonal and said x-axis conjointly define an angle ($\alpha$) lying in a range of 20° to 70° when viewed in the direction of said first axis.

6. The portable handheld work apparatus of claim 5, further comprising a second spatial diagonal; and, said second spatial diagonal and said x-axis conjointly defining an angle ($\beta$) lying in a range of −20° to −70° when viewed in the direction of said first axis.

7. The portable handheld work apparatus of claim 1, wherein said base plate has a first opening for accommodating said drive shaft extending therethrough; said base plate has a second opening for accommodating said driven shaft extending therethrough; and, said peripheral wall has first and second peripheral wall sections lying on mutually opposite edges of said base plate with reference to said connecting line.

8. The portable handheld work apparatus of claim 7, wherein said spatial diagonal composite reinforcement structure extends from said first peripheral wall section to said second peripheral wall section in a region between said first axis and said second axis and from one side of the base plate to the other side of said base plate with the two sides of said base plate being the inner and outer sides of said base plate, respectively.

9. The portable handheld work apparatus of claim 7, wherein said base plate has a region without reinforcement structures next to said second opening; and, said region without reinforcement structures extends from said first peripheral wall section to said second peripheral wall section.

10. The portable handheld work apparatus of claim 9, wherein said one spatial diagonal is a first spatial diagonal and said carrier part has a second spatial diagonal; each one of said spatial diagonals intersects one of said peripheral wall sections at a first intercept and the other of said peripheral wall sections at a second intercept; and, said first intercept is at a distance (c, d) to said first opening of less than the diameter (e, f) of at least one of said first and second openings and said region without reinforcement structures runs between said second intercept and said second opening.

11. The portable handheld work apparatus of claim 10, wherein said second opening is configured on a bearing eye surrounded by an annularly-shaped wall.

12. The portable handheld work apparatus of claim 11, wherein a reinforcement structure is arranged on said annularly-shaped wall and extends to said peripheral wall; and, said region without reinforcement structures connects to said reinforcement structure arranged on said annularly-shaped wall.

13. The portable handheld work apparatus of claim 7, wherein at least one of said reinforcement structures includes a reinforcement rib rising linearly-shaped from said base plate.

14. The portable handheld work apparatus of claim 13, wherein at least one of said reinforcement structures includes a reinforcement pocket rising area-wise from said base plate.

15. The portable handheld work apparatus of claim 13, wherein a plurality of said reinforcement structures includes respective reinforcement pockets rising area-wise from said base plate; and, at least half of said reinforcement pockets rise from said outer side.

16. The portable handheld work apparatus of claim 14, wherein said spatial diagonal composite reinforcement structure includes at least one reinforcement rib and at least one reinforcement pocket; and, at least one of said reinforcement structures rises from the reinforcement rib and the reinforcement pocket corresponding thereto from said inner side of said base plate and at least the other of said reinforcement structures rises from the reinforcement rib and the reinforcement pocket corresponding thereto from said outer side of said base plate.

17. The portable handheld work apparatus of claim 13, wherein said first opening is delimited by a wall and a bearing eye is arranged at said second opening; said wall is configured to rise mostly on said inner side of said base plate; and, said bearing eye is configured to rise from said inner side and from said outer side of said base plate.

* * * * *